Aug. 20, 1929.   G. A. CARLSON   1,725,506
CHAIN AND WHEEL DRIVE
Filed Feb. 8, 1924
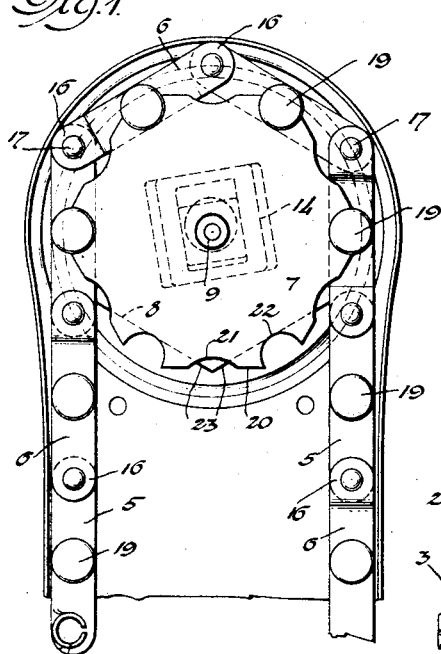
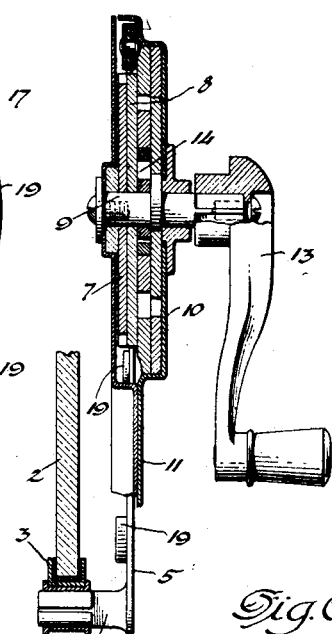
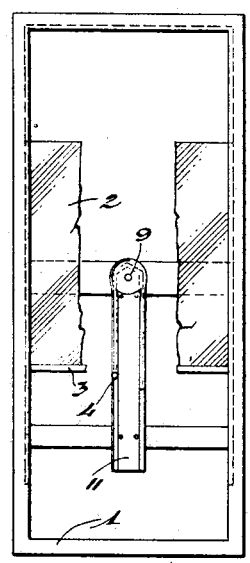
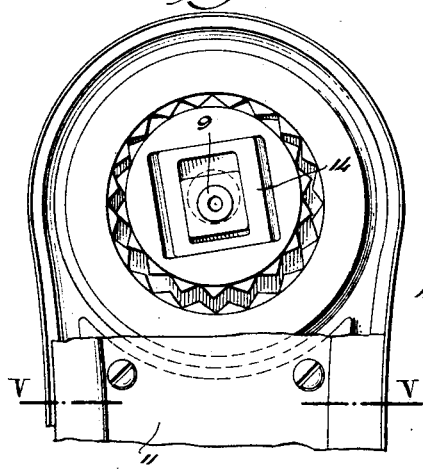
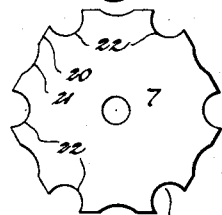
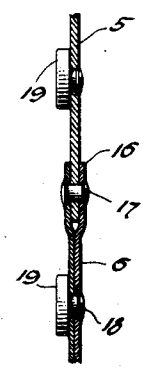
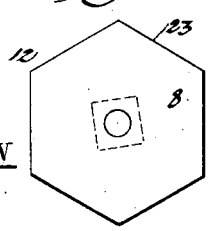
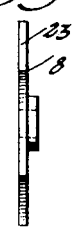
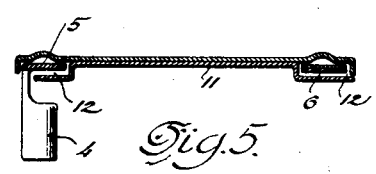
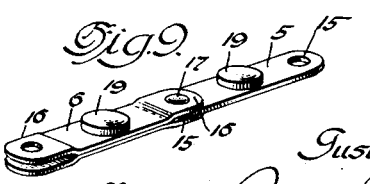
Inventor:
Gustave A. Carlson
By Barthel Parker
Attorneys Patented Aug. 20, 1929.

1,725,506

UNITED STATES PATENT OFFICE.

GUSTAVE A. CARLSON, OF DETROIT, MICHIGAN.

CHAIN AND WHEEL DRIVE.

Application filed February 8, 1924. Serial No. 691,416.

In my pending application filed Jan. 14, 1924, Ser. No. 685,976 there is disclosed a sash regulating device especially designed for automobiles, the device including an arbor driven wheel over which is trained a sash supporting chain or flexible member, and this application is particularly directed to the arbor operated wheel and the sash supporting chain.

An ordinary sprocket wheel and chain has a tooth and link driving connection, the teeth of the sprocket wheel being greatly relied upon to support the chain and any weight carried thereby, and it is these very same teeth that establish the driving relation between the sprocket wheel and chain. In contradistinction to such a wheel and chain, I have driving and supporting means which may be considered independent of each other as far as the function of such means is concerned, the supporting means being such that the weight of any load is not directly placed upon the driving means, and the driving means is independent of the supporting means or if there is any relation it is beneficial to the driving means to the extent of increasing the driving relation.

Compared to an ordinary sprocket chain I have a chain or flexible member composed of links, which are durable and inexpensive to manufacture and the pivotal connection between the links is not depended upon for direct driving purposes, for instance as the link connecting pins of an ordinary sprocket chain. My links are of such configuration that two or more thereof may cooperate in establishing a supporting relation with an arbor driven wheel having facets on which the links may rest and obtain a firm purchase, the facets being disposed at such angles that when the chain is trained over the wheel facets there is a supporting relation that precludes one part of the chain from pulling another part thereof over the wheel. With the chain link so supported there is provision in connection with said links for establishing a driving relation between the links and another portion of the arbor operated wheel, and the driving means is not subjected to any stresses or strains of a chain load as is the case in connection with an ordinary sprocket chain and wheel.

My improvement will be better understood by aid of the drawing and the following descriptive matter. In the drawing Figure 1 is a front elevation of an arbor driven wheel and a portion of a chain showing the same relative to a portion of a casing which permits of the chain and wheel being readily used as a sash regulating device;

Fig. 2 is a vertical cross sectional view of the same relative to a portion of a sash;

Fig. 3 is a front elevation of a frame having a sash adjustable therein by a regulating device including a wheel and chain in accordance with this invention;

Fig. 4 is a front elevation of a portion of the sash regulating device associated with my improved chain and wheel;

Fig. 5 is a horizontal sectional view taken on the line V—V of Fig. 4;

Fig. 6 is a front elevation of the driving portion of my improved wheel;

Fig. 7 is a similar view of the supporting portion of the wheel;

Fig. 8 is an edge view of the same;

Fig. 9 is a perspective view of two of the links of a chain in accordance with my invention, and Fig. 10 is a longitudinal sectional view of the same.

As a good example of the use of my wheel and chain for shifting a load, I show a frame 1 having an adjustable sash 2 therein and the bottom rail 3 of the sash is adapted to be supported by or connected to a projection 4 on the end of my chain, which is composed of articulated links 5 and 6 adapted to be shifted by my wheel composed of a driving portion 7 and a supporting portion 8. The wheel is loosely mounted on an arbor 9 journaled in the housing 10 of a casing 11, said casing having guideways 12 for the chain, so that the chain cannot sway or become accidentally displaced during any adjustment thereof by the wheel. The winding arbor 9 has a crank 13 or other operating device and within the housing 10 is an irreversible gear mechanism generally designated 14, said gear mechanism transmitting power from the arbor 9 to my wheel, but prohibiting rotation of the arbor by the wheel, thus precluding any possibility of the weight of the sash 2 rotating the arbor.

Considering the construction of the chain, the links 5 and 6 are cut and stamped from sheet metal, said links being oblong in elevation with the ends of the links 5 apertured, as at 15. The links 6 are each composed of two matched members having off-set apertured ends 16 and when the members of these links are connected together the off-set apertured ends 16 are in spaced relation to receive the apertured ends of the links 5, thus permitting of the ends of the links 5 and 6 being pivotally connected together by rivets 17 or other pivotal means.

Intermediate the ends of each of the links 5 and 6 are rivets 18 or other fastening means for side studs or pins 19 and the fastening means of said studs to the links 6 serve as fastening means for connecting the coinciding members of each of the links 6. This is best shown in Fig. 10

Considering the construction of the wheel and particularly the portions 7 and 8, the portion 7 has peripheral angularly disposed facets 20 provided with clearance recesses 21. At what may be considered the juncture of the facets 20 are sockets 22 adapted to receive the studs 19 of the chain, said sockets having semi-cylindrical walls to receive semi-cylindrical portions of said studs, so that there is an intimate and positive driving relation between the wheel portion 7 and the chain. In order that the chain may be moved by the driving portion 7 the recesses 21 afford clearance for the pivotal connections 17 of the chain links.

The supporting portion 8 of the wheel has a plurality of angularly disposed facets 23 and as shown in Fig. 7 the supporting portion has a regular hexagonal configuration, that is, the facets are of equal length and in practice approach the length of each chain link, as best shown in Fig. 1, so that the inner edges of those links engaging the supporting portion 8 will bear on two or more facets of the supporting portion 8 of the wheel.

For the purpose of producing a cheap wheel the portions 7 and 8 thereof may be cut and stamped from sheet metal and then the two portions spot welded or otherwise connected together, just as though integral, therefore it is obvious that a one-piece wheel body may have its periphery of such configuration as to provide the various facet recesses and sockets shown in Figs. 6 and 7. With the two wheel portions connected together the wheel is placed on the arbor 9 and in such relation to the housing 10 and the chain that the studs 19 of the chain will be over the driving portion 7 and the links over the supporting portion 8. As a result of this arrangement the wheel engaging links will be on the facets 23 and the studs 19 of said links will be in the sockets 22. This means that the weight of the sash and one end of the chain will be sustained by the supporting portion 8 of the wheel because certain of the links cannot drag others over the angularly related facets of the supporting portion 8. There is a binding action which precludes any slippage and in consequence of this constructive arrangement of the wheel and chain the studs 19 may engage in the sockets 22 of the driving portion 9 solely for establishing a greater driving relation than that maintained by the links engaging the facets 23. In other words, there is a positive driving connection between the chain and the wheel, but the connection is not subjected to any stresses and strains incident to a load on the chain. The wheel and chain are capable of better use and for this reason I do not care to confine my invention to the precise construction shown and described, other than as may be set forth in the appended claims.

What I claim is:—

1. A chain and sprocket wheel mechanism comprising a drive wheel having driving portions and a polygonal supporting portion, said driving portion having sockets formed therein, a chain composed of links adapted to lie on the sides of said supporting portion, and studs extending laterally from said links intermediate the ends thereof and adapted for reception in said sockets.

2. A chain and sprocket wheel mechanism comprising a drive wheel having driving portions and a polygonal supporting portion, the former being formed with recesses and sockets, a chain composed of links adapted to lie on the sides of said supporting portion, the links of the chain having pivotal connections adapted for connection in said recesses, and studs extending laterally from said links intermediate the ends thereof and adapted for reception in said sockets.

In testimony whereof I affix my signature.

GUSTAVE A. CARLSON.